US010019422B2

(12) United States Patent
Doan et al.

(10) Patent No.: US 10,019,422 B2
(45) Date of Patent: Jul. 10, 2018

(54) MERGING AND FRAGMENTING GRAPHICAL OBJECTS

(71) Applicant: Microsoft Technology Licensing, LLC, Redmond, WA (US)

(72) Inventors: Christopher Doan, Redmond, WA (US); Christopher Becker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 396 days.

(21) Appl. No.: 14/053,617

(22) Filed: Oct. 15, 2013

(65) Prior Publication Data

US 2014/0047326 A1    Feb. 13, 2014

Related U.S. Application Data

(63) Continuation of application No. 13/277,327, filed on Oct. 20, 2011, now Pat. No. 8,560,933.

(51) Int. Cl.
*G06F 17/00*    (2006.01)
*G06F 17/24*    (2006.01)
*G06F 17/22*    (2006.01)
*G06T 11/60*    (2006.01)

(52) U.S. Cl.
CPC .......... *G06F 17/24* (2013.01); *G06F 17/2288* (2013.01); *G06T 11/60* (2013.01)

(58) Field of Classification Search
CPC ..... G06F 17/24; G06F 17/211; G06F 17/2288
See application file for complete search history.

(56) References Cited

U.S. PATENT DOCUMENTS

| 5,181,162 A * | 1/1993 | Smith ................ G06F 17/2205 707/999.104 |
| 5,315,709 A * | 5/1994 | Alston, Jr. ........ G06F 17/30569 |
| 5,581,682 A * | 12/1996 | Anderson ............ G06F 17/241 715/236 |
| 5,588,149 A * | 12/1996 | Hirose ............. G06F 17/30265 |
| 5,649,171 A * | 7/1997 | Craven ................ G11B 27/028 703/23 |
| 6,034,684 A * | 3/2000 | Proehl .................. G06F 3/0481 715/764 |
| 6,081,262 A * | 6/2000 | Gill ........................ G06T 11/60 707/E17.009 |
| 6,358,341 B1 | 3/2002 | Bergquist |
| 6,718,336 B1 * | 4/2004 | Saffer ............... G06F 17/30557 |

(Continued)

FOREIGN PATENT DOCUMENTS

CN    1650313 A    8/2005

OTHER PUBLICATIONS

"Anchored Objects," Retrieved Date: Aug. 19, 2011, 12 pgs., http://help.adobe.com/en_US/InDesign/6.0/WSa285fff53dea4f8617383751001ea8cb3f6c43a.html.

(Continued)

*Primary Examiner* — Laurie A Ries (57) ABSTRACT

Object merging in an electronic document may be provided. First, a selection of at least two objects within the electronic document may be received. Then, in response to the received selection of the at least two objects, a menu listing a plurality of merge operations configured to be performed on the selected at least two objects may be provided. A merge operation may then be selected, previewed, and applied to the selected at least two objects.

20 Claims, 6 Drawing Sheets

(56) References Cited

U.S. PATENT DOCUMENTS

| | | | |
|---|---|---|---|
| 7,480,665 B2 | 1/2009 | Merchant et al. | |
| 7,546,602 B2 | 6/2009 | Hejlsberg et al. | |
| 7,689,909 B1 | 3/2010 | Szuszczewicz | |
| 7,747,946 B2 | 6/2010 | Nelson et al. | |
| 7,788,579 B2 | 8/2010 | Berkner et al. | |
| 8,019,155 B2* | 9/2011 | Hibino | G06F 17/30551 382/168 |
| 8,560,933 B2 | 10/2013 | Doan et al. | |
| 8,847,983 B1* | 9/2014 | Ranganathan | G06T 11/60 345/594 |
| 9,672,498 B2* | 6/2017 | Nguyen Manh | G06Q 10/20 |
| 2003/0056179 A1 | 3/2003 | Mori | |
| 2003/0067496 A1 | 4/2003 | Tasker et al. | |
| 2004/0008223 A1* | 1/2004 | Britton | G06F 17/21 715/762 |
| 2004/0190063 A1 | 9/2004 | Brown | |
| 2005/0005248 A1 | 1/2005 | Rockey et al. | |
| 2005/0088542 A1* | 4/2005 | Stavely | H04N 5/23222 348/239 |
| 2005/0140678 A1 | 6/2005 | Gielis et al. | |
| 2006/0115185 A1 | 6/2006 | Iida et al. | |
| 2006/0170669 A1* | 8/2006 | Walker | G06F 3/0362 345/418 |
| 2007/0043830 A1 | 2/2007 | Housenbold et al. | |
| 2007/0234205 A1 | 10/2007 | Lloyd et al. | |
| 2007/0250492 A1* | 10/2007 | Angel | G06F 17/3097 |
| 2008/0109729 A1 | 5/2008 | Notea et al. | |
| 2008/0141155 A1 | 6/2008 | Wierowski et al. | |
| 2009/0083710 A1* | 3/2009 | Best | G06F 9/4446 717/120 |
| 2009/0106674 A1 | 4/2009 | Bray et al. | |
| 2009/0133260 A1 | 5/2009 | Durbin et al. | |
| 2009/0138495 A1 | 5/2009 | Kalaboukis et al. | |
| 2009/0141939 A1 | 6/2009 | Chambers et al. | |
| 2009/0147011 A1* | 6/2009 | Buck | G06F 19/3487 345/501 |
| 2009/0150784 A1* | 6/2009 | Denney | G06F 17/3084 715/722 |
| 2009/0183108 A1 | 7/2009 | Arrouye et al. | |
| 2009/0307583 A1 | 12/2009 | Tonisson | |
| 2010/0030752 A1 | 2/2010 | Goldentouch | |
| 2010/0060941 A1* | 3/2010 | Zhang | H04N 1/00233 358/3.28 |
| 2010/0118025 A1* | 5/2010 | Smith | G06Q 30/02 345/418 |
| 2010/0153839 A1 | 6/2010 | Wilkins | |
| 2010/0180213 A1 | 7/2010 | Karageorgos et al. | |
| 2010/0225814 A1 | 9/2010 | Kozono et al. | |
| 2010/0257457 A1 | 10/2010 | De Goes | |
| 2010/0315431 A1 | 12/2010 | Smith et al. | |
| 2011/0029860 A1* | 2/2011 | Ptucha | G06F 17/248 715/246 |
| 2011/0179346 A1 | 7/2011 | Dufour et al. | |
| 2011/0231478 A1 | 9/2011 | Wheeler et al. | |
| 2011/0252359 A1* | 10/2011 | England | G06F 9/4443 715/781 |
| 2012/0224068 A1* | 9/2012 | Sweet, III | G06K 9/32 348/169 |
| 2013/0104037 A1 | 4/2013 | Doan et al. | |

OTHER PUBLICATIONS

"Second Office Action and Search Report Issued in Chinese Patent Application No. 201210402735.8", dated Jun. 18, 2015, 10 Pages.

Chinese First Office Action dated Oct. 10, 2014 cited in Application No. 201210402735.8, 13 pgs.

"Third Office Action Issued in Chinese Patent Application No. 201210402735.8", dated Dec. 28, 2015, 7 Pages.

* cited by examiner

MERGING AND FRAGMENTING GRAPHICAL OBJECTS

RELATED APPLICATION

This application is a continuation of U.S. application Ser. No. 13/277,327 entitled "Merging and Fragmenting Graphical Objects" filed Oct. 20, 2011, which issued on Oct. 15, 2013 as U.S. Pat. No. 8,560,933, which is incorporated herein by reference.

BACKGROUND

Some word processing software allows users to edit text and integrate graphical objects with the text in an electronic document. The graphical objects may be, for example, pictures, tables, charts, or shapes. However, a toolset that allows users to create and manipulate these graphical objects in complex ways has not yet been integrated with word processing software.

SUMMARY

Merging and fragmenting graphical objects may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Object merging in an electronic document may be provided. First, a selection of at least two objects within the electronic document may be received. Then, in response to the received selection of the at least two objects, a menu listing a plurality of merge operations configured to be performed on the selected at least two objects may be provided. A merge operation may then be selected, previewed, and applied to the selected at least two objects.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conventional document creation software, such as word processing software, may provide users with user-friendly drawing tools for inserting graphical objects, such as simple shapes, into an electronic document. However, when it comes to customizing these graphical objects or creating custom graphics within the electronic document, conventional word processing software may only provide a limited set of options to the users. For example, the users may either draw custom graphics by hand (using, for example, the freeform, curve, or scribble tool) or use complicated functions to modify existing graphics. Drawing custom graphics by hand may lack precision and require extreme dexterity, and using the complicated functions to modify existing graphics may require knowledge of, for example, vector shape editing. Unfortunately, neither of these conventional options may be suitable for the typical beginner or intermediate user.

Embodiments of the invention may provide a merge tool within a document creation environment. The merge tool may enable users to merge multiple graphical objects into a single, customized object. In this way, a user may quickly and easily create custom graphics using only simple graphical objects. For example, the user may create a Christmas tree by merging several triangles and a star.

The merge tool may employ five merge operations to create custom graphics out of multiple objects: union, combine, subtract, intersect, and fragment operations. FIGS. 1A through 1E illustrate each of these merge operations. As shown in FIGS. 1A through 1E, the graphical objects selected to be merged may comprise a primary object 105 and a secondary object 110. Consistent with embodiments of the invention, objects that may be merged may comprise, but not be limited to, for example, shapes with closed outer path geometries, text-bearing shapes, text, pictures, picture-filled shapes, and videos. Using any one of the aforementioned operations, primary object 105 may be merged with secondary object 110 to create a resultant object 115.

Figure 1A:
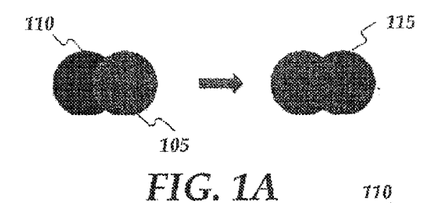
FIGS. 1A through 1E are diagrams illustrating merge operations.
Figure 1B:
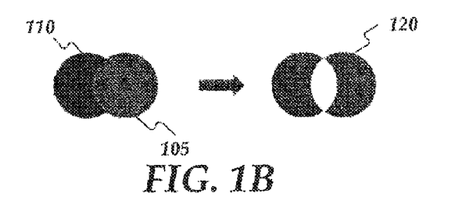

FIG. 1A illustrates a union operation. The union operation may create a new object (e.g., resultant object 115) using the non-overlapping perimeters of overlapping objects (e.g., primary object 105 and secondary object 110). FIG. 1B illustrates a combine operation. The combine operation may cut out the overlapping portions of the overlapping objects (e.g., primary object 105 and secondary object 110) to create a new object (e.g., resultant object 120) with the remaining object pieces.

Figure 1C:
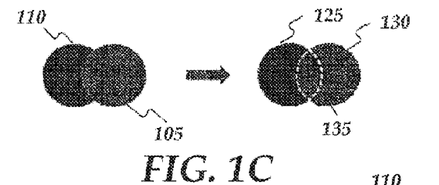
Figure 1D:
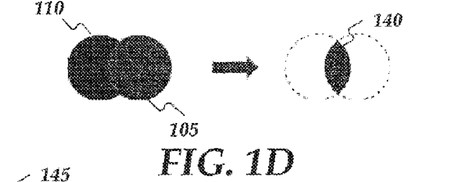

FIG. 1C illustrates a fragment operation. The fragment operation may create multiple new objects (e.g., resultant objects 125, 130, and 135) by dividing the overlapping objects (e.g., primary object 105 and secondary object 110) along all of their overlapping perimeters. FIG. 1D illustrates an intersect operation. The intersect operation may create a new object (e.g., resultant object 140) out of the overlapping portions of the overlapping objects (e.g., primary object 105 and secondary object 110).

Figure 1E:
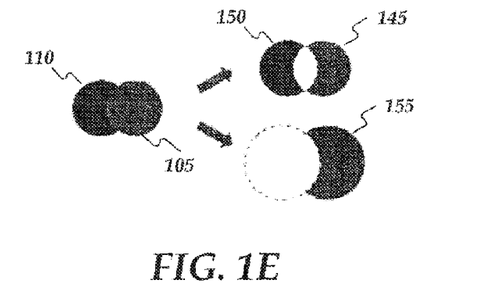

FIG. 1E illustrates a subtract operation. The subtract operation may yield two results. First, the subtract operation may create multiple new objects (e.g., resultant objects 145 and 150) by subtracting overlapping areas from both an overlapping primary object (e.g., primary object 105) and overlapping non-primary objects (e.g., secondary object 110). Alternatively, the subtract operation may create a single new object (e.g., resultant object 155) by subtracting the overlapping non-primary objects (e.g., secondary object 110) from the overlapping primary object (e.g., primary object 105).

Figure 2A:
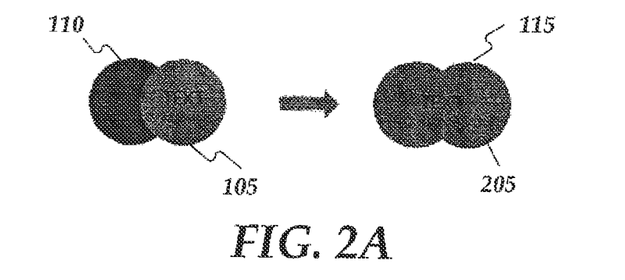
FIGS. 2A through 2C are diagrams illustrating merge operations.
Figure 2B:
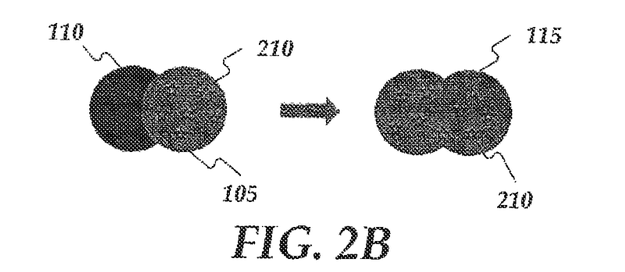

Consequently, the merge operations may yield different results depending on which of the selected graphical objects is considered the primary object (e.g., primary object 105). For example, resultant object 115 may inherit certain properties of primary object 105 while discarding certain properties of secondary object 110. FIGS. 2A through 2B illustrate two examples of property inheritance.

As shown in FIG. 2A, primary object 105 may comprise text 205. When primary object 105 is merged with secondary object 110 to form resultant object 115, text 205 may be transferred to resultant object 115. In various other embodiments, primary object 105 may comprise a pattern 210 as shown in FIG. 2B. Pattern 210 may be, for example, a graphical object, an image, or any type of a graphical fill. When primary object 105 is merged with secondary object 110 to form resultant object 115, pattern 210 may be transferred to resultant object 115.

Figure 2C:
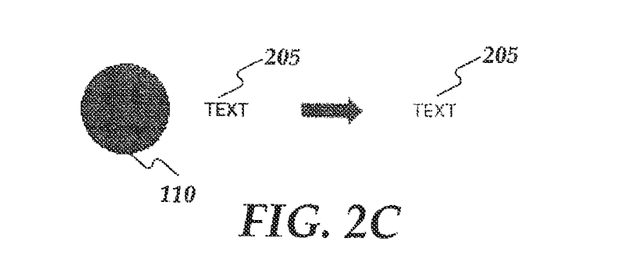

In yet other embodiments, text 205 may be merged with secondary object 110 as shown in FIG. 2C. In these embodiments, text 205 may inherit certain properties as a resultant object, such as a color of secondary object 110, while preserving its textual properties as a primary selected object. As will be detailed below with respect to FIG. 3, certain properties of text 205 and pattern 210, such format, layout, effects, and stretch/offset, may be preserved in resultant object 115 when inherited into resultant object 115.

Figure 3:
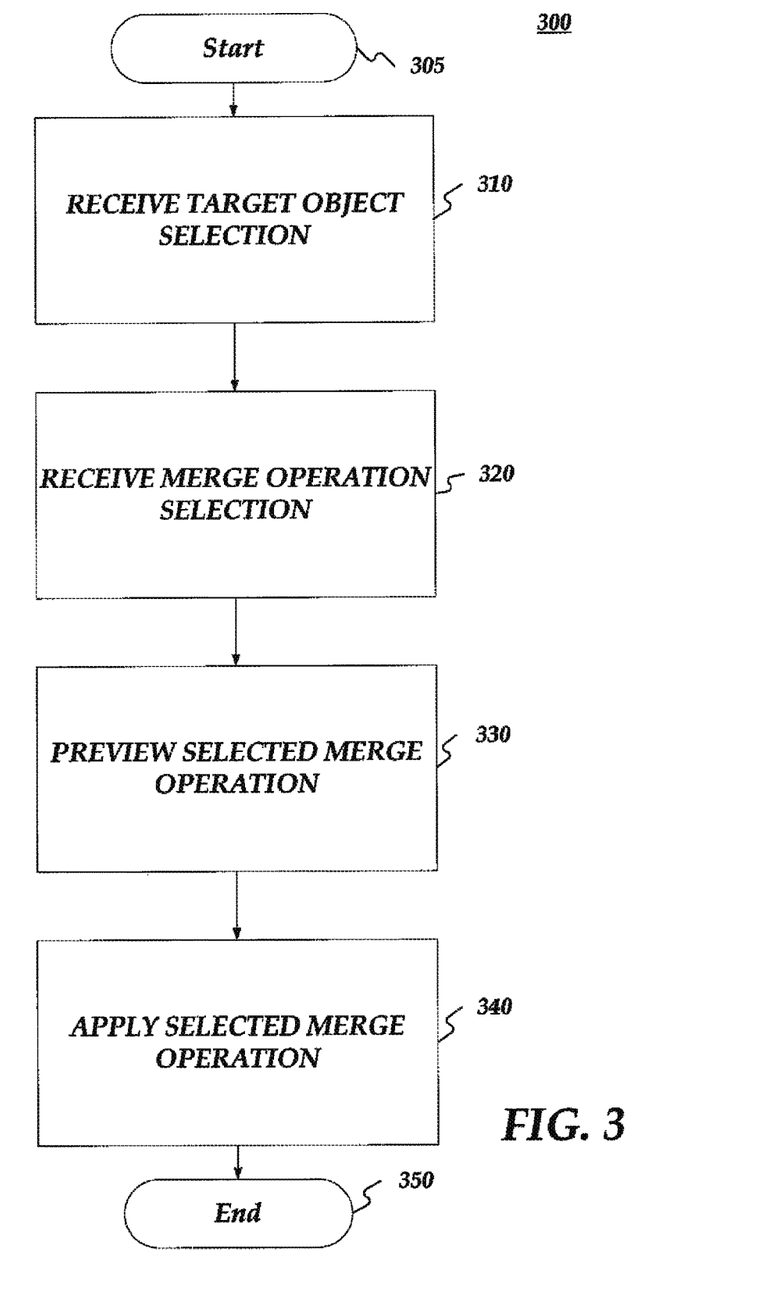
FIG. 3 is a flow chart of a method for providing merge operations.

FIG. 3 is a flow chart setting forth the general stages involved in a method 300 consistent with an embodiment of the invention for providing merge operations. Method 300 may be implemented using a computing device 600 as described in more detail below with respect to FIG. 6. Ways to implement the stages of method 300 will be described in greater detail below.

Method 300 may begin at starting block 305 and proceed to stage 310 where computing device 600 may receive a selection of target objects to be merged. For example, an electronic document may comprise a plurality of objects, such as shapes, pictures, and video. The user may wish to combine these objects in order to form a new, customized object. Accordingly, the user may select which of the objects are to be merged and arrange these objects in the general geometry of the new object the user wishes to create. In various embodiments, the user may designate a primary object (e.g. primary object 105) by selecting an object that the user wishes to be the primary object before sequentially selecting the remaining target objects.

From stage 310, where computing device 600 has received the selection of the target objects to be merged, method 300 may advance to stage 320 where computing device 600 may receive a selection of a merge operation to be performed on the target objects. Having selected the target objects and designated on the target objects as the primary object, the user may then be provided with merge operations for selection.

Figure 4:
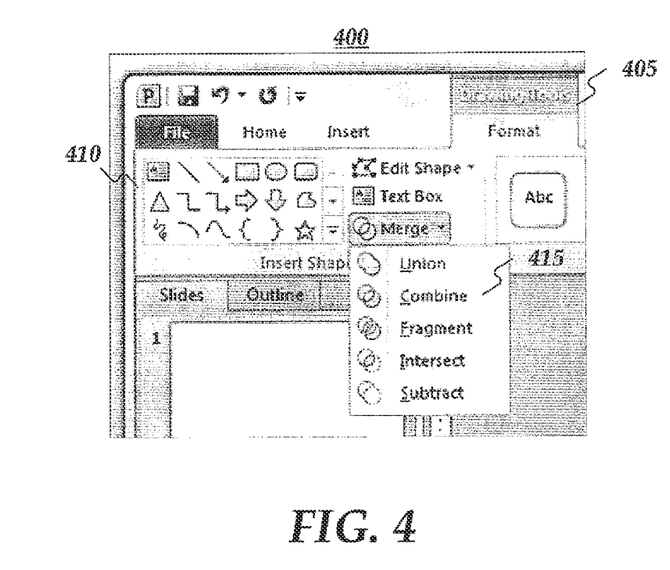
FIG. 4 is a screen shot illustrating merge operation selections.

FIG. 4 is a screen shot of one embodiment of providing merge operations for selection. Upon selection of the target shapes, a 'Drawing Tools' tab 405 may appear in user interface 400 of a document creation environment. User interface 400 may comprise, under tab 405, a plurality of drawing tools 410. The merge operations may be provided within a menu 415 of drawing tools 410. Upon selection of menu 415, a drop down listing of the various merge operations may be provided, and the user may elect to perform one of these operations on the target shapes by selecting a listed operation.

Once computing device 600 receives the selection of the merge operation in stage 320, method 300 may continue to stage 330 where computing device 600 may preview the selected merge operation. For example, when the user's input device, such as a mouse or keyboard, hovers over or highlights one of the merge operation selections in menu 415, the target shapes may be dynamically modified to reflect a resultant object to be created upon application of the selected merge operation. The dynamic modification may only be temporary. In this way, the user may scan through the merge operations and preview the resultant objects created by the merge operations before resting on a final selection.

After computing device 600 previews the selected merge operation in stage 330, method 300 may proceed to stage 340 where computing device 600 may apply the selected merge operation. Having received the final selection, a resultant object may be created from the selected target objects. As mentioned above, the resultant object may inherit some properties of the primary object. For example, when a union, combine, intersect, or subtract merge operation has been applied to the target objects, the resultant object may preserve, among other properties, a fill, outline, rotation, effect, and text of a primary target object.

When a fragment merge operation has been applied to the target objects, fragments created from the overlapping object areas may inherit the properties of the primary object. Fragments created from non-overlapping areas may retain the properties of their original object. For example, referring back to FIG. 1C, resultant object 135 is shown to inherit the properties of primary object 105, while resultant object preservers the properties of secondary object 125.

Figure 5A:
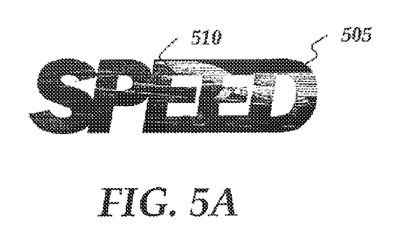
FIGS. 5A through 5D are screen shots illustrating merged objects.
Figure 5B:
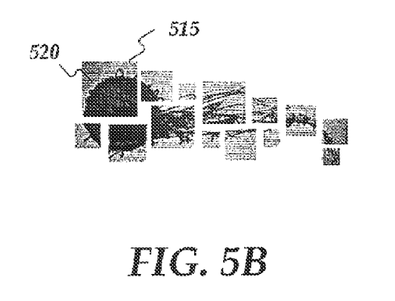

FIGS. 5A through 5D illustrate various examples of resultant objects created by the merge operations. FIG. 5A depicts resultant object 505 that was created when an image 510, such as a race car, designated as a primary objected, was intersected with a target object in the shape of the word 'speed'. In this example, image 510 was cropped to fit within the 'speed' shape, and resultant object 505 inherited the image properties of image 510 into the 'speed' shape. Similarly, in FIG. 5B, an image of a jelly fish 520, designated as a primary object, was intersected with a plurality of tiles. Image 520 was cropped to fit within the plurality of tiles to form a resultant object 515 that comprises cropped portions of image 520.

Accordingly, when a merge operation, such as union, combine, intersect, and subtract, is performed on a picture object, the boundaries of the picture object are subject to change, as the picture must be edited to merge with the target objects. In order to preserve the size, position and aspect ratio of the picture within the newly formed object, stretch/offset values may be applied to the picture to counteract any skewing or shifting that may occur as a result of the geometric operation on the picture. In effect, the new geometry will act as a crop shape on the picture, and the size and position of the picture may not change.

Figure 5C:
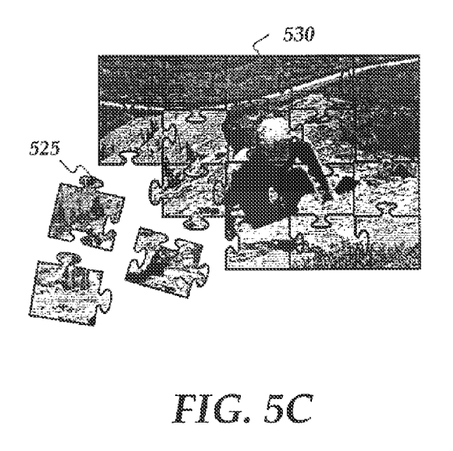

When a fragment merge operation is performed with a picture designated as a primary object, the resulting fragments may inherit the picture as a fill. In other words, each resultant fragment may only have a portion of the picture. For example, FIG. 5C shows a picture 530 fragmented into fragments 525. The portion of picture 530 within fragments 525 may correspond to a location of the corresponding fragment within picture 530. Moreover, as shown in FIG. 5C, fragments 525 may be individually manipulated, such as moved, rotated, or otherwise edited, while preserving their corresponding portion of picture 530.

Figure 5D:
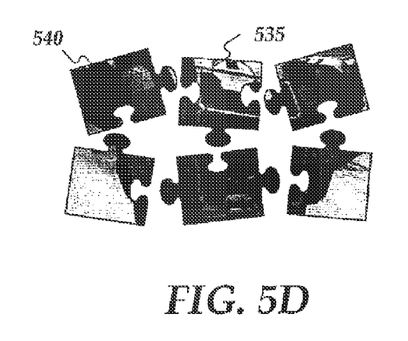

Consistent with embodiments of the invention, a multimedia object, such as a video 535 shown in FIG. 5D, may be designated as a primary object. Video 535 may then be fragmented, and each fragment 540 may comprise a corresponding video portion and subsequently be manipulated. In turn, each fragment 540 may playback a corresponding portion of video 535 individually or simultaneously with the other fragmented portions of video 535. Once computing device 600 applies the merge operation in stage 340, method 300 may then end at stage 350.

An embodiment consistent with the invention may comprise a system for merging objects in an electronic document. The system may comprise a memory storage and a processing unit coupled to the memory storage. The processing unit may be operative to receive a selection of at least two objects; receive a selection of a merge operation for the at least two objects; preview the selected merge operation; and apply the selected merge operation.

Another embodiment consistent with the invention may comprise a system for merging objects in an electronic document. The system may comprise a memory storage and a processing unit coupled to the memory storage. The processing unit may be operative to receive a selection of at least two objects within the electronic document; provide, in response to the selection of the at least two objects, a menu listing a plurality of merge operations configured to be performed on the selected at least two objects; receive a first selection of a merge operation of the plurality of merge operations; preview the selected merge operation; receive a second selection of the merge operation; and apply the selected merge operation.

Yet another embodiment consistent with the invention may comprise a system for merging shapes in an electronic document. The system may comprise a memory storage and a processing unit coupled to the memory storage. The processing unit may be operative to receive a selection of at least two shapes within the electronic document, receive a designation of a primary shape, the primary shape comprising at least one of the following: a text and an image, provide a menu listing a plurality of merge operations configured to be performed on the selected at least two shapes, the plurality of merge operations comprising at least one of the following: a union operation, a combine operation, a fragment operation, an intersect operation, and a subtract operation, receive a first selection of a merge operation of the plurality of merge operations, preview the selected merge operation, receive a second selection of the merge operation, create, in response the second selection, at least one new shape from the at least two shapes, and transfer at least one of the following: the text and the image within the primary shape to the at least one new shape.

Figure 6:
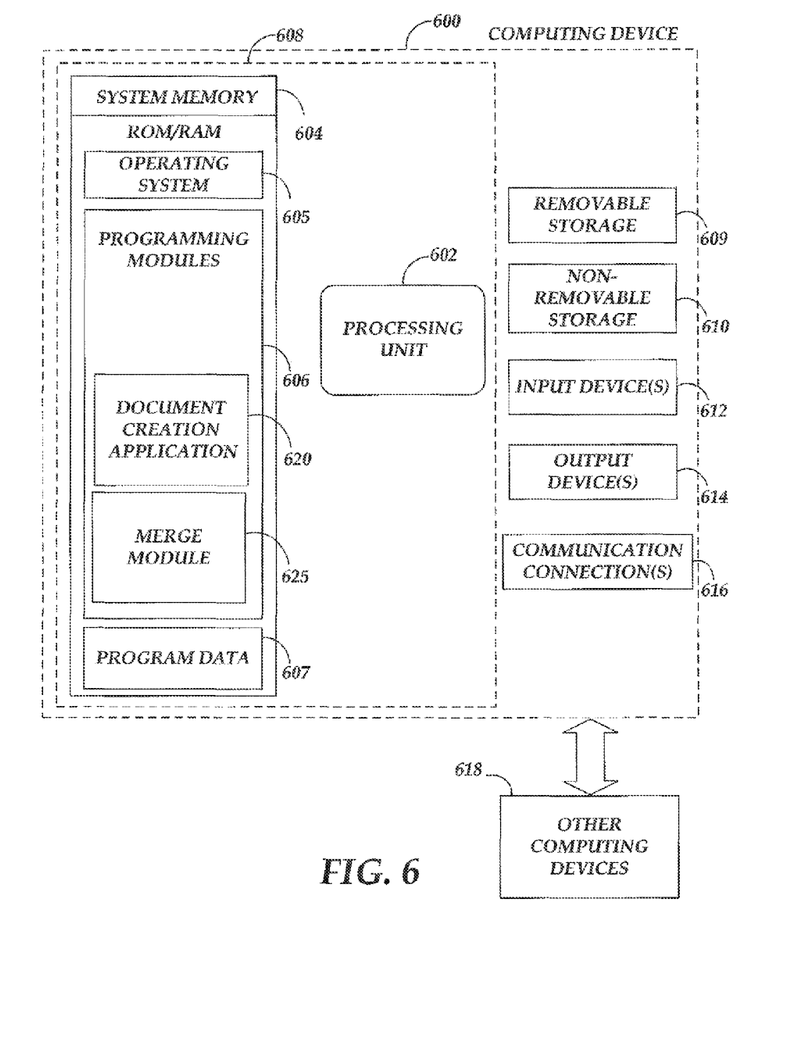
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include document creation application 620 and merge module 625. Document creation application 620 may be operative to perform, for example, word processing, spreadsheet processing, and/or presentation processing. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. document creation application 620 and merge module 625) may perform processes including, for example, one or more method 300's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

In a distributed computing environment, program modules may be located in both local and remote memory storage devices. The program modules may be stored on any number of storage media that may be accessed by via a wired or wireless connection. Similarly, the modules may be readily accessed and transferred between computing devices.

Embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the invention, may be performed via application-specific logic integrated with other components of computing device 600 on the single integrated circuit (chip). Moreover, the components illustrated in FIG. 6 may be practiced, for example, in a mobile device or in a cloud computing system.

Computing device 600 may be coupled to a camera that may be operative to record a user and capture motions and/or gestures made by the user. Computing device 600 may be further operative to capture words spoken by the user, such as by a microphone, and/or capture other inputs from the user such as by a keyboard and/or mouse. Consistent with embodiments of the invention, the camera may comprise any motion detection device capable of detecting the movement of the user. For example, the camera may comprise a Microsoft® Kinect® motion capture device comprising a plurality of cameras and a plurality of microphones.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for merging objects in an electronic document, the method comprising:
    concurrently displaying text and at least two objects in the electronic document, wherein the electronic document is one of a word processing document, a spreadsheet document, a database document, a presentation slide document, or an electronic mail document;
    receiving a selection of the at least two objects;
    displaying a plurality of options for editing the electronic document at a location outside of the electronic document, wherein the plurality of options includes an option for a merge operation of multiple objects;
    identifying a hover by a pointing device over the option for the merge operation for the at least two objects;
    based on the identification of the hover, previewing the selected merge operation of the at least two objects, wherein the preview is displayed within the electronic document;
    receiving a selection of the merge operation; and
    applying the selected merge operation for the selected two objects.

2. The method of claim 1, wherein receiving the selection of the at least two objects comprises receiving a designation of a primary object from the at least two selected objects.

3. The method of claim 2, wherein applying the selected merge operation comprises creating at least one new object from the at least two objects.

4. The method of claim 3, wherein applying the selected merge operation comprises applying at least one property of the primary object to the at least one new object.

5. The method of claim 4, wherein applying the at least one property of the primary object to the at least one new object comprises transferring a text within the primary object to the at least one new object.

6. The method of claim 4, wherein applying the at least one property of the primary object to the at least one new object comprises transferring a picture within the primary object to the at least one new object.

7. The method of claim 2, wherein applying the selected merge operation comprises creating a plurality of fragment objects from the at least two objects.

8. The method of claim 7, wherein creating the plurality of fragment objects from the at least two objects comprises applying a portion of an image within the primary object to each of the plurality of fragment objects.

9. The method of claim 7, further comprising manipulating at least one fragment of the plurality of fragment objects while preserving properties of the at least one fragment, wherein at least one of the properties of the at least one fragment is inherited from the primary object.

10. The method of claim 9, wherein manipulating the at least one fragment of the plurality of fragment objects comprises at least one of the following: moving the at least one fragment and rotating the at least one fragment.

11. The method of claim 7, wherein creating the plurality of fragment objects from the at least two objects comprises applying a portion of a video within the primary object to each of the plurality of fragment objects.

12. The method of claim 1, wherein receiving the selection of the at least two objects comprises receiving a selection of at least one of the following: a geometric shape, a text-bearing object, a text, a picture, a picture-filled object, and a video.

13. The method of claim 1, wherein receiving the selection of the merge operation comprises receiving a selection of one of the following: a union operation, a combine operation, a fragment operation, an intersect operation, and a subtract operation.

14. The method of claim 1, wherein receiving the selection of the merge operation comprises receiving a selection from a menu listing a plurality of merge operations, the menu being provided in response to receiving the selection of the at least two objects.

15. A computer-readable storage device comprising a set of instructions which when executed performs a method for merging objects in an electronic document, the method executed by the set of instructions comprising:
    displaying at least two objects in the electronic document, wherein the electronic document is one of a word processing document, a spreadsheet document, a database document, a presentation slide document, or an electronic mail document;
    receiving a selection of the at least two objects within the electronic document;
    providing, in response to the received selection of the at least two objects, a menu listing a plurality of different types of merge operations configured to be performed on the selected at least two objects;
    identifying a hover by a pointing device over an option for a first type of merge operation of the plurality of merge operations;
    based on the identification of the hover, previewing the first type of merge operation of the at least two objects in the electric document, wherein the preview is displayed within the electronic document;
    receiving a selection of the first type of merge operation; and
    applying the selected first type of merge operation.

16. The computer-readable storage device of claim 15, wherein the method executed by the set of instructions further comprises receiving a designation of a primary object of the selected at least two objects.

17. The computer-readable storage device of claim 16, wherein applying the selected merge operation comprises creating at least one new object from the selected at least two objects, the at least one new object inheriting properties from the primary object.

18. The computer-readable storage device of claim 15, wherein receiving the selection of the first type of merge operation comprises receiving a mouse-click on the first type of merge operation in the menu comprising the plurality of merge operations.

19. The computer-readable storage device of claim 15, wherein the method executed by the set of instructions further comprises:
   identifying a subsequent hover by the pointing device over an option for a second type of merge operation of the plurality of merge operations; and
   based on the identification of the subsequent hover, previewing the second type of merge operation of the at least two objects in the electric document, wherein the preview is displayed within the electronic document.

20. A system for merging shapes within an electronic document, the system comprising:
   a memory storage; and
   a processing unit coupled to the memory storage, the processing unit being configured to:
      receive a selection of at least two shapes concurrently displayed within the electronic document, wherein the electronic document is one of a word processing document, a spreadsheet document, a database document, a presentation slide document, or an electronic mail document,
      receive a designation of a primary shape, the primary shape comprising at least one of the following: a text and an image,
      provide a menu listing a plurality of merge operations configured to be performed on the selected at least two shapes, the plurality of merge operations comprising at least one of the following: a union operation, a combine operation, a fragment operation, an intersect operation, and a subtract operation, wherein providing the menu does not obscure the selected at least two shapes;
      identify a hover by a pointing device over an option for a merge operation of the plurality of merge operations,
      upon identifying the hover by the pointing device, preview the selected merge operation of the at least two objects, wherein the preview is displayed within the electronic document;
      receive a selection of the merge operation,
      create, in response the selection, at least one new shape from the at least two shapes, and
      transfer at least one of the following: the text and the image within the primary shape to the at least one new shape.

* * * * *